(12) United States Patent
Crea

(10) Patent No.: US 7,438,148 B1
(45) Date of Patent: Oct. 21, 2008

(54) CHILD MOTORIZED RIDING TOY WITH REMOTE CONTROL

(76) Inventor: Dominick Crea, 670 White Plains Rd., Suite 322, Scarsdale, NY (US) 10583

( * ) Notice: Subject to any disclaimer, the term of this patent is extended or adjusted under 35 U.S.C. 154(b) by 0 days.

(21) Appl. No.: 11/047,523

(22) Filed: Jan. 31, 2005

(51) Int. Cl.
B62D 1/24 (2006.01)
B62D 1/28 (2006.01)

(52) U.S. Cl. .......................... 180/167; 180/65.1; 180/56
(58) Field of Classification Search ................. 180/167, 180/169, 55, 56, 65.1, 65.6, 65.8, 908; 280/DIG. 5
See application file for complete search history.

(56) References Cited

U.S. PATENT DOCUMENTS

| | | | |
|---|---|---|---|
| 3,557,304 A | 1/1971 | Rue et al. | |
| 3,762,478 A | 10/1973 | Cummins | |
| 3,768,367 A | 10/1973 | Fuzzell | |
| 4,155,554 A * | 5/1979 | Adamski et al. | 273/359 |
| 4,267,663 A | 5/1981 | Nagahara | |
| 4,342,175 A | 8/1982 | Cernansky et al. | |
| 4,383,388 A | 5/1983 | Suimon | |
| 4,776,415 A * | 10/1988 | Brice | 180/11 |
| 5,158,495 A * | 10/1992 | Yonezawa | 446/456 |
| 5,184,694 A | 2/1993 | Magrath, Jr. et al. | |
| 5,194,844 A * | 3/1993 | Zelda | 340/426.11 |
| 5,338,247 A * | 8/1994 | Miles | 446/456 |
| 5,439,071 A | 8/1995 | Rodriguez-Ferre | |
| 5,816,352 A | 10/1998 | Hacker | |
| 5,924,507 A * | 7/1999 | Prather | 180/167 |
| 5,994,853 A * | 11/1999 | Ribbe | 318/16 |
| 6,283,220 B1 | 9/2001 | Carter | |
| 6,656,010 B1 * | 12/2003 | Bienz et al. | 446/431 |
| 6,783,425 B2 * | 8/2004 | McKeefery | 446/455 |
| 7,029,363 B2 * | 4/2006 | Ogihara | 446/454 |
| 2005/0029030 A1 * | 2/2005 | Ewert | 180/167 |

FOREIGN PATENT DOCUMENTS

| | | |
|---|---|---|
| EP | 0139521 | 5/1985 |
| WO | WO2004/075456 | 2/2004 |

* cited by examiner

*Primary Examiner*—Christopher Ellis
*Assistant Examiner*—Vaughn T Coolman
(74) *Attorney, Agent, or Firm*—Michael I Kroll

(57) ABSTRACT

A controllable vehicle system and method of using a vehicle capable of being manual and remote control. The system includes a vehicle and a remote control unit. The vehicle includes a compartment for receiving a rider and at least one wheel. Manual controls are provided for controlling operation of the at least one wheel upon receipt of a control signal from the rider. A control override switch disables the manual controls. The vehicle also includes a receiver and a vehicle transmitter which generates and transmits a distance signal. The remote control device includes a device for generating control signals based upon command signals received from a user. A remote transmitter is provided for transmitting the control signals to the vehicle transmitter for controlling the control override and control operation of the at least one wheel.

7 Claims, 10 Drawing Sheets

CHILD MOTORIZED RIDING TOY WITH REMOTE CONTROL

BACKGROUND OF THE INVENTION

1. Field of the Invention

The present invention relates generally to motorized vehicles and, more specifically, to rideable motorized toys. The vehicle is selectively controllable using at least one of manual controls operable by a user riding in the vehicle and a remote control unit operable by a party not riding in the vehicle. The present invention also provides a range limiting device to disable the vehicle if the vehicle exceeds the predetermined perimeter.

2. Description of the Prior Art

There are other control devices designed for motorized vehicles in the prior art. Typical of these is U.S. Pat. No. 3,557,304 issued to Rue on Jan. 19, 1971.

Another patent was issued to Cummins on Oct. 2, 1973 as U.S. Pat. No. 3,762,478. Yet another U.S. Pat. No. 3,768,367 was issued to Fuzzell on Oct. 30, 1973 and still yet another was issued on May 19, 1981 to Nagahara as U.S. Pat. No. 4,267,663.

Another patent was issued to Cernansky et al on Aug. 3, 1982 as U.S. Pat. No. 4,342,175. Yet another U.S. Pat. No. 4,383,388 was issued to Suimon on May 17, 1983. Another was issued to Magrath, Jr. et al on Feb. 9, 1993 as U.S. Pat. No. 5,184,694 and still yet another was issued on Aug. 8, 1995 to Rodriguez-Ferre as U.S. Pat. No. 5,439,071.

Another patent was issued to Hacker on Oct. 6, 1998 as U.S. Pat. No. 5,816,352. Yet another U.S. Pat. No. 6,283,220 was issued to Carter on Sep. 4, 2001. Another was issued to Verwey on May 2, 1985 as European Patent Application No. EP 0139521 and still yet another was issued on Sep. 2, 2004 to Gavish as International Patent Application No. WO 2004/075456.

U.S. Pat. No. 3,557,304

Inventor: Richard O. Rue

Issued: Jan. 19, 1971

A system for flying a drone aircraft by remote control comprising a television camera mounted in the cockpit of the drone aircraft where the pilot's head is normally located; a wide-angle lens mounted on the television camera; transmitting means to send the pictures back to the ground where they are projected using rear projection means onto a hemispherical viewing screen; and a remote ground control for flying the drone in response to the pictures received from the cockpit television camera.

U.S. Pat. No. 3,762,478

Inventor: Phil F. Cummins

Issued: Oct. 2, 1973

The specification discloses a remote controlled hazard-fighting vehicle including a chassis having crawler tracks mounted on opposite sides thereof. Motors are mounted within the chassis for independently advancing the crawler tracks. A movable turret is mounted on the upper part of the chassis and includes a movable nozzle for being attached through a flexible hose to a source of pressurized fluid. A portable transmitter is provided to selectively generate a plurality of unique tone signal combinations. A receiver is mounted within the chassis for receiving the tone signal combinations, and circuitry within the chassis is responsive to the output of the receiver in order to control the advancement of the crawler tracks and the movement of the turret and nozzle.

U.S. Pat. No. 3,768,367

Inventor: Joe E. Fuzzell

Issued: Oct. 30, 1973

A crawler loader vehicle has remote control means capable of effecting intermediate settings of the operator's control linkages as well as extreme positions and provides for remotely initiating movement of the lift arms and bucket with automatic stopping at the intermediate position if desired. Hydraulic jacks, actuatable through radio controlled solenoid valves, are substituted for existing links in control lever linkages. The jacks perform as a conventional rigid link when the operator is situated on the vehicle and provide for the remote control if the operator's control levers are locked in fixed position.

U.S. Pat. No. 4,267,663

Inventor: Sin Nagahara

Issued: May 19, 1981

A frame of the motorcycle rotatably bears at its rear end, the rear wheel and has, at the front end, a pivot shaft extending along the central axis of the frame. Rotatably connected to the pivot shaft is a connecting block that supports a handle shaft axis of the front wheel. The connecting block is rotated about the pivot shaft by a servomotor which is driven by the signals from the transmitter and whose rotating force is conveyed to the block via the transmission mechanism whereby the frame is forcibly banked to turn the motorcycle.

U.S. Pat. No. 4,342,175

Inventor: Joseph S. Cernansky et al.

Issued: Aug. 3, 1982

A two-wheeled motorcycle having a frame carrying a drive motor, a radio, a servo mechanism controlled by the radio, and a power source for driving the motor, radio, and servo. The servo mechanism includes a weight which may be moved to one side or the other of a generally vertical plane extending through the motorcycle when it is in an upright position. The steering crown is arranged so that a plane including the axes of the down tube and the fork is behind the main pivot. The axle of the front wheel is in the plane of the fork axes. The plane including these axes intersects the surface upon which the motorcycle rests at an angle in the range of about 20.degree.-25.degree. relative to vertical. The arrangement of the steering crown is such that, when the servo moves the weight to one side of the generally vertical plane, the front wheel will tend to turn into the direction in which the weight is moved. This is accomplished by insuring that the plane including the axes of the down tubes and forks are behind, but parallel to, the pivot axis of the crown, relative to the frame.

U.S. Pat. No. 4,383,388

Inventor: Yoshio Suimon

Issued: May 17, 1983

A toy remote-control bicycle of the type is disclosed wherein a rear wheel is mounted on the rear portion of a chassis and a front wheel is mounted on the front portion of a chassis via a front fork portion in a manner switchable in either the clockwise or the counterclockwise directions and wherein said front wheel is supported by an improved front wheel mechanism that does not transmit a shock caused by a collision to the directional steering mechanism when the said front wheel collides against an obstacle.

U.S. Pat. No. 5,184,694

Inventor: Earl K. Magrath, Jr. et al.

Issued: Feb. 9, 1993

A system for controlling at least one go kart in an operation area includes a general transmitter, an area transmitter, a receiver unit on each go kart and an idling device. The operation area includes a track and a pit area. The general transmitter is either a radio transmitter or a loop which encircles the entire operation area. Upon activation of the general transmitter, a signal is emitted such that go karts anywhere in the operation area are idled by the idling device. Activation of the area transmitter, on the other hand, will cause the idle device to idle go karts in at least one of the pit area and an approach area to the pit. This area transmitter includes a loop which encircles the pit area and/or the approach area. A control device with a timer is provided to automatically activate the area transmitter when a predetermined time has elapsed. The control device will also permit an operator to activate the general transmitter when an emergency situation arises. This general transmitter can idle all go karts in the operation area or can idle only one selected go kart. A kit can also be provided to adapt go karts to this system. The kit includes the receiver unit and idling device as well as a governor arm. The governor arm is connectable between the governor of the go kart engine and the idle device which includes a solenoid.

U.S. Pat. No. 5,439,071

Inventor: Jose M. Rodriguez-Ferre

Issued: Aug. 8, 1995

A child's toy vehicle having a safety device includes a vehicle having a receiver circuit which may be enabled by an electromagnetic signal emitted by a remote control, handled by an adult, and a pushbutton, in series with a motor, to be depressed by the child driving the vehicle. A switch breaks the supply to the receiver circuit thereby disabling it at the same time as it makes a bridge across the power supply and the child operated pushbutton. The invention is applicable to children's toy vehicles driven by very young children, so that an adult located remotely can break the motor supply to stop the vehicle at any given time, for safety purposes.

U.S. Pat. No. 5,816,352

Inventor: Brian A. Hacker

Issued: Oct. 6, 1998

A battery-powered toy vehicle permitting conversion between rider control and remote radio control is provided. A steering assembly attached to the underside of the toy vehicle is capable of being both remotely controlled by a radio controlled steering actuator, and rider controlled by a steering wheel. A switch effects the mechanism for converting between radio-control and steering wheel control.

U.S. Pat. No. 6,283,220

Inventor: Mark David Carter

Issued: Sep. 4, 2001

A remote control vehicle comprising a body having a front end and a rear end and provided with first and second ground engageable propulsion means respectively disposed on opposite sides of the vehicle and in which the first and second propulsion means are driven by first and second transmission means respectively to permit the vehicle to be propelled and steered by driving the propulsion means on one side of the vehicle independently from the propulsion means on the other side of the vehicle, a boom assembly having carrying means for carrying an implement on the boom assembly, the boom assembly being mounted on the body for lifting movement between a raised position and a lowered position by a lifting means and wherein the ground engageable propulsion means and the lifting means of the boom assembly are operable by a receiver, of an electromagnetic signal, provided on the body.

European Patent Application Number EP0139521

Inventor: Cornelius Johannes Verwey

Published: May 2, 1985

The invention provides a remote controlled toy vehicle which may convey passengers. The toy vehicle is suitable for carrying children who are unable to control the vehicle themselves as they are too young or even handicapped; the vehicle being operated by an operator external to the vehicle.

International Patent Application Number
WO2004/075456

Inventor: Dan Gavish

Issued: Sep. 2, 2004

The invention discloses a method and apparatus by which an adult accompanying a child riding a mobile ride-on toy, can continuously determine if the child is free to fully operate the toy, or else. The adult can force the toy to slow down, and/or to stop, and/or to otherwise control the ride-on toy in order to protect the child's safety. The adult can gain control by operating a wireless remote-control unit. Furthermore, the adult can limit the distance between the ride-on toy and the adult, so that the child cannot drive too far away from the adult, i.e., the toy automatically stops as soon as the predetermined range limit is reached. Also, the ride-on toy can be used as long as it is under the control of the adult, but it automatically stops when the adult loses control over the ride-on toy.

While these control devices may be suitable for the purposes for which they were designed, they would not be as suitable for the purposes of the present invention, as hereinafter described.

SUMMARY OF THE PRESENT INVENTION

The present invention relates generally to motorized vehicles and, more specifically, to rideable motorized toys. The vehicle is selectively controllable using at least one of manual controls operable by a user riding in the vehicle and a remote control unit operable by a party not riding in the vehicle. The present invention also provides a range limiting device to disable the vehicle if the vehicle exceeds the predetermined perimeter.

A primary object of the present invention is to provide a child-rideable motorized vehicle that overcomes the shortcomings of the prior art.

Another, secondary object of the present invention is to provide a motorized child-rideable toy having a remote control transmitter.

Another object of the present invention is to provide a child-rideable motorized vehicle responsive to control signals received from the remote control transmitter for controlling the vehicle.

Yet another object of the present invention is to provide a child-rideable motorized vehicle having a receiver for receiving the control signals from the remote control transmitter.

Another object of the present invention is to provide a child-rideable motorized vehicle wherein a user riding therein is able to manually control the vehicle.

Still yet another object of the present invention is to provide a child-rideable motorized vehicle wherein the remote control transmitter includes a switch for generating a signal able to enable and disable the operator controls of the vehicle.

Another object of the present invention is to provide a child-rideable motorized vehicle wherein the receiver communicates with the vehicle's control system.

Yet another object of the present invention is to provide a child-rideable motorized vehicle having a plurality of servo motors for driving the wheels of the motorized vehicle.

Still yet another object of the present invention is to provide a child-rideable motorized vehicle wherein the remote control transmitter generates signals able to selectively engage or disengage the servo motors.

Another object of the present invention is to provide a child-rideable motorized vehicle wherein the remote control unit is able to selectively control the speed of the vehicle.

Yet another object of the present invention is to provide a range limiting device able to disable the vehicle when the vehicle travels outside a predetermined perimeter.

Still yet another object of the present invention is to provide a child-rideable motorized vehicle having user operational controls able to control operation of the vehicle similarly to the remote unit.

Another object of the present invention is to provide a child-rideable motorized vehicle providing control to a third party to enhance supervision and safety.

Yet another object of the present invention is to provide a child-rideable motorized vehicle which is simple and easy to use.

Still yet another object of the present invention is to provide a child-rideable motorized vehicle which is cost effective and economical to manufacture.

Additional objects of the present invention will appear as the description proceeds.

The present invention overcomes the shortcomings of the prior art by providing a child-rideable motorized-vehicle incorporating a receiver. The receiver accepts command signals from a remote control transmitter. A plurality of servo motors are responsive to signals received by the receiver to engage and disengage the manual operator controls. When disengaged the remote control transmitter provides additional means for controlling the speed and direction of the child-rideable motorized vehicle. If the vehicle moves outside of a predetermined perimeter in the remote mode the vehicle is disabled.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
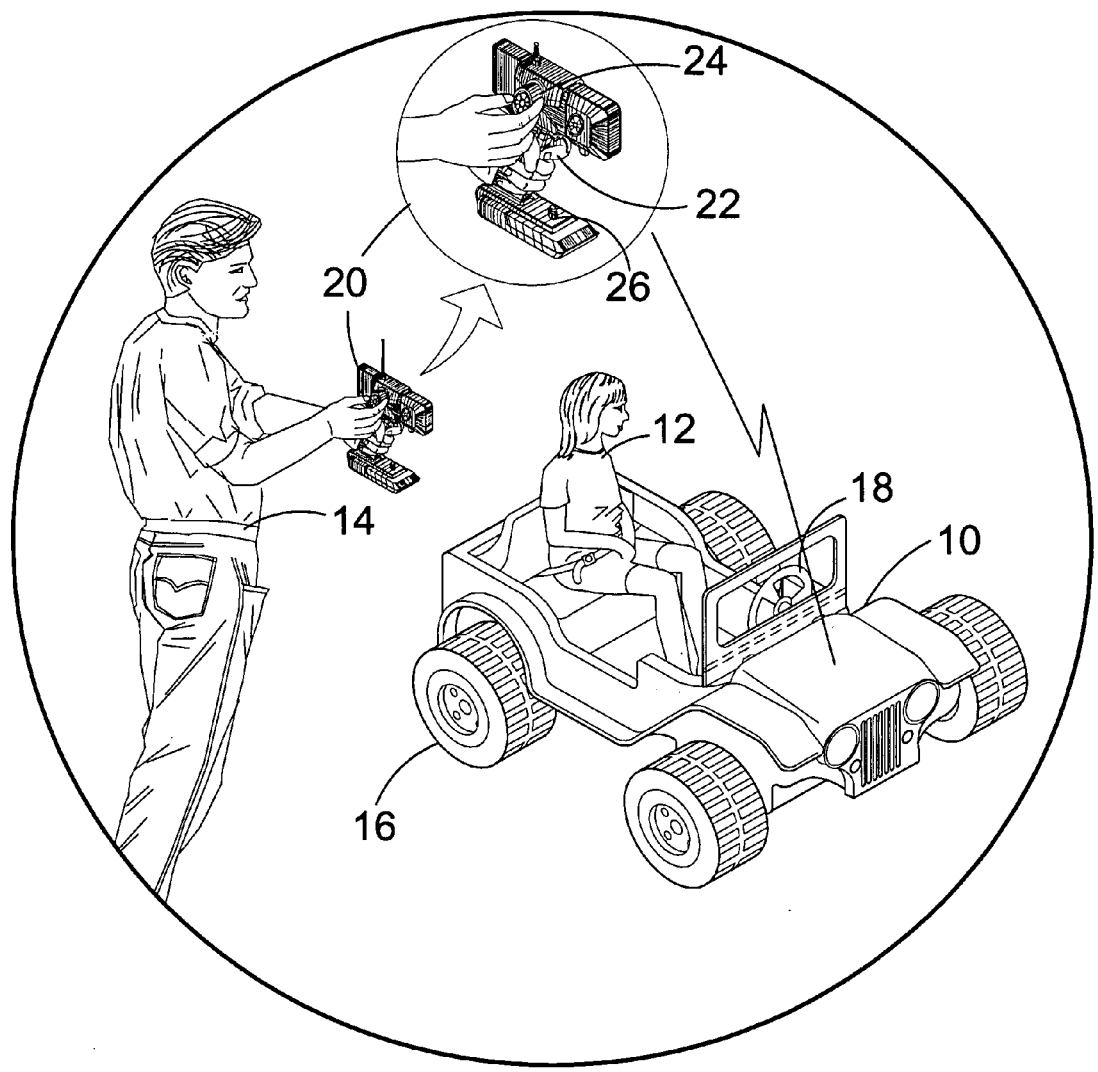
FIG. 1 is an illustrative view of the child-rideable motorized vehicle of the present invention in use.

Turning now descriptively to the drawings, in which similar reference characters denote similar elements throughout the several views, the Figures illustrate the child-rideable motorized vehicle of the present invention. With regard to the reference numerals used, the following numbering is used throughout the various drawing Figures.

10 Child-rideable motorized vehicle of the present invention.
12 Child
14 Parent
16 Tire
18 Manual controls
20 Remote control transmitter
22 Acceleration trigger
24 Directional controller
26 Enable/Disable switch
28 Driver
30 Servo motor
32 Axle
34 Wire
36 Axle bushing
38 Cap nut
40 Battery
42 Receiver/Servo controller
44 Steering servo motor
46 Gear box
48 Transceiver antenna
50 Receiver

DETAILED DESCRIPTION OF THE PREFERRED EMBODIMENT

The following discussion describes in detail one embodiment of the invention and several variations of that embodiment. This discussion should not be construed, however, as limiting the invention to those particular embodiments, practitioners skilled in the art will recognize numerous other embodiments as well. For definition of the complete scope of the invention, the reader is directed to appended claims.

Turning now descriptively to the drawings, in which similar reference characters denote similar elements throughout several views, FIGS. 1 through 10 illustrate the child-rideable motorized vehicle which is indicated generally by the numeral 10.

In the children's toy industry it is desirable to provide manually operable controlled toy vehicles containing a remotely controlled override device providing for parental control. While systems exist for manually controlled toy vehicles there is a need for a toy vehicle having a parental control system providing override controls to enhance supervision capabilities.

FIG. 1 is an illustrative view of the child-rideable motorized vehicle 10 of the present invention in use. The child-rideable motorized vehicle 10 is a 4×4 vehicle having tires 16 for providing stable movement thereof. Although a 4×4 vehicle is preferred, in practice the vehicle can be of any type including any amount of tires. The child-rideable motorized vehicle 10 of the present invention may be used in a manual mode or a remote override mode. In a manual mode the child or rider 12 can control the child-rideable motorized vehicle 10 using manual controls 18. Manual controls 18 provide control of speed and direction to the child 12. The child-rideable motorized vehicle 10 of the present invention is operable in remote override mode using a remote control unit 20. The remote control unit 20 includes a directional controller 24, acceleration trigger 22 and an Enable/Disable switch 26. Remote override mode is entered upon a parent's 14 activation of Enable/Disable switch 26 of the remote control unit 20. Once remote override mode is enabled, manual controls 18 are disabled. Directional controller 24 allows the parent 14 to guide the vehicle to the left or right by generating control signals that are transmitted to the vehicle 10 and the acceleration trigger 22 allows the parent 14 to control the speed of the vehicle by generating control signals that are transmitted to the vehicle 10. Upon activation of the switch 26 a second time the remote override mode is disabled and the manual controls 18 are re-enabled.

Figure 2:
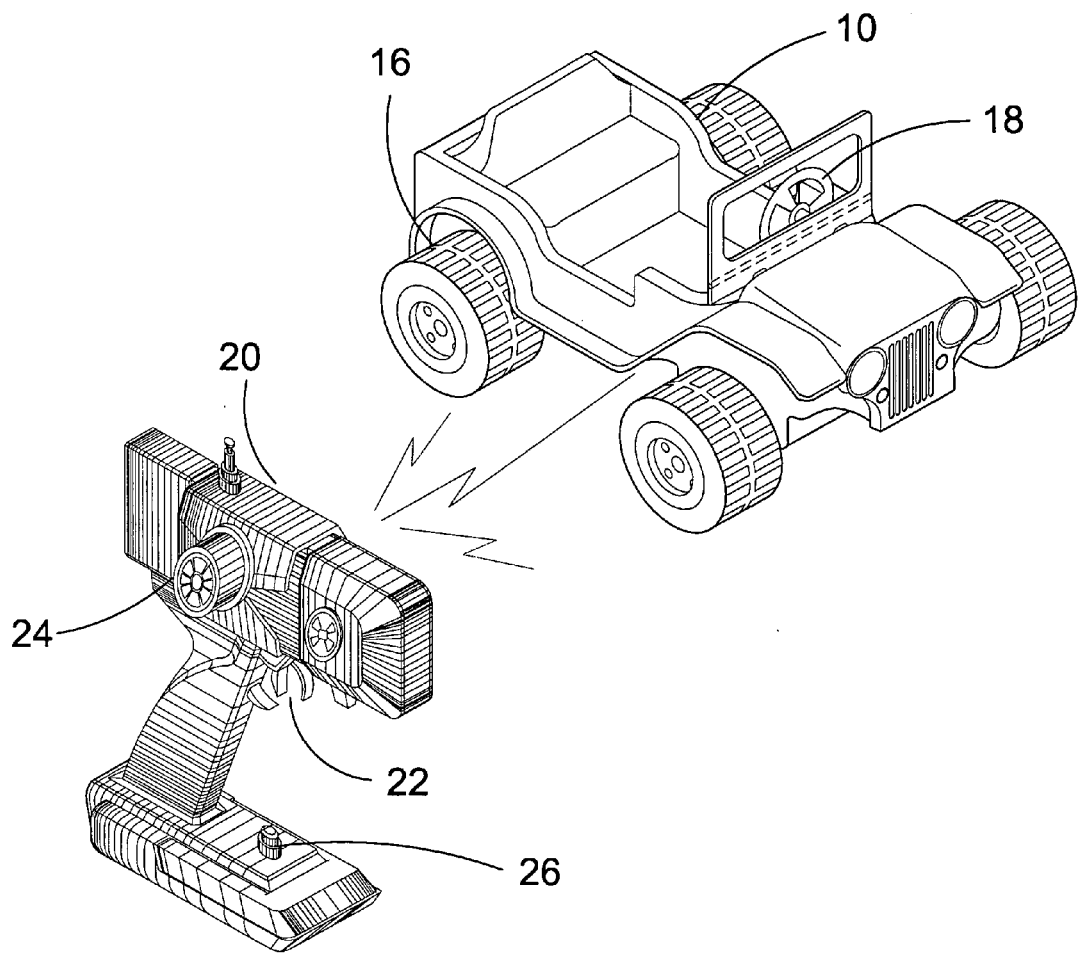
FIG. 2 is a perspective view of the child-rideable motorized vehicle of the present invention.

FIG. 2 is a perspective view of the child-rideable motorized vehicle 10 of the present invention. The child-rideable motorized vehicle 10 is a 4×4 vehicle having tires 16 providing stable movement. Although a 4×4 vehicle is preferred in an optimal embodiment, in practice the vehicle can be of any type with any number of tires. The child-rideable motorized vehicle 10 of the present invention may be used in a manual mode or a remote override mode. In a manual mode control of the child-rideable motorized vehicle 10, the rider is able to control the vehicle manually using manual controls 18 therein. The manual controls 18 provide control of speed and direction of the vehicle. The toy child-rideable motorized vehicle 10 of the present invention is operable in remote override mode using a remote control unit 20. The remote control unit 20 includes a directional controller 24, acceleration trigger 22 and an Enable/Disable switch 26. Remote override mode is entered upon a parent's 14 activation of Enable/Disable switch 26 of the remote control unit 20. Once remote override mode is enabled, manual controls 18 are disabled. Directional controller 24 allows the parent 14 to guide the vehicle to the left or right by generating control signals that are transmitted to the vehicle 10 and the acceleration trigger 22 allows the parent 14 to control the speed of the vehicle by generating control signals that are transmitted to the vehicle 10. Upon activation of the switch 26 a second time the remote override mode is disabled and the manual controls 18 are re-enabled.

Figure 3:
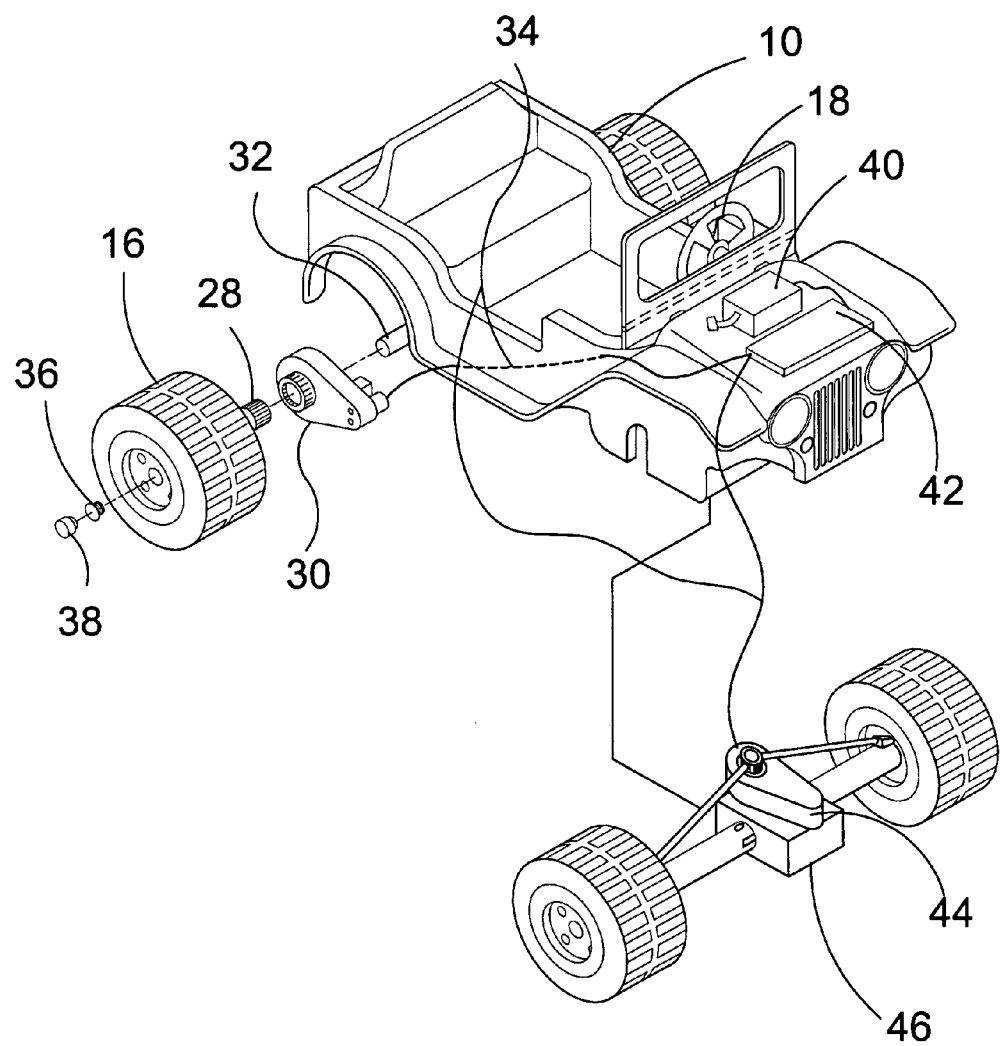
FIG. 3 is an exploded view of the child-rideable motorized vehicle of the present invention.

FIG. 3 is an exploded view of the child-rideable motorized vehicle 10 of the present invention. The child-rideable motorized vehicle 10 is a 4×4 vehicle having tires 16 providing stable movement. Although a 4×4 vehicle is preferred in an optimal embodiment, in practice the vehicle can be of any type with any number of tires. The child-rideable motorized vehicle 10 of the present invention may be used in a manual mode or a remote override mode.

In a manual mode signals for controlling operation of the vehicle are generated by the manual controls 18. In remote override mode signals for controlling operation of the vehicle are generated by receiver/servo controller 42. The child-rideable motorized vehicle 10 also includes a servo motor 30 and steering servo motor 44. The steering servo motor 44 is further connected to the gear box 46 which controls the direction in which vehicle 10 is moving. Receiver/servo controller 42, servo motor 30 and steering servo motor 44 are powered by battery 40. A control wire 34 connects the receiver/servo controller 42 each of the servo motor 30 and steering servo motor 44. Acceleration control signals relate data indicating a desired speed. Acceleration control signals from receiver/servo controller 42 travel along control wire 34 to servo motor 30 to control the speed of the vehicle 10. Left rear wheel 16 is secured to a driver 28 by an axle bushing 36 topped by a cap nut 38. Right rear wheel 16 is secured to axle 32. Driver 28 and axle 32 are both driven by servo motor 30 to rotate when active. Driver 28 rotates the left rear wheel 16 while axle 32 rotates the right rear wheel 16. Directional control signals relate data indicating whether the vehicle will make a left or right turn. Directional control signals from receiver/servo controller 42 travel along control wire 34 to steering servo motor 44. When activated, the steering servo motor 44 causes the gearbox 46 to guide the direction of front wheels 16 to the left or right depending on the data contained in the directional control signal.

Figure 4:
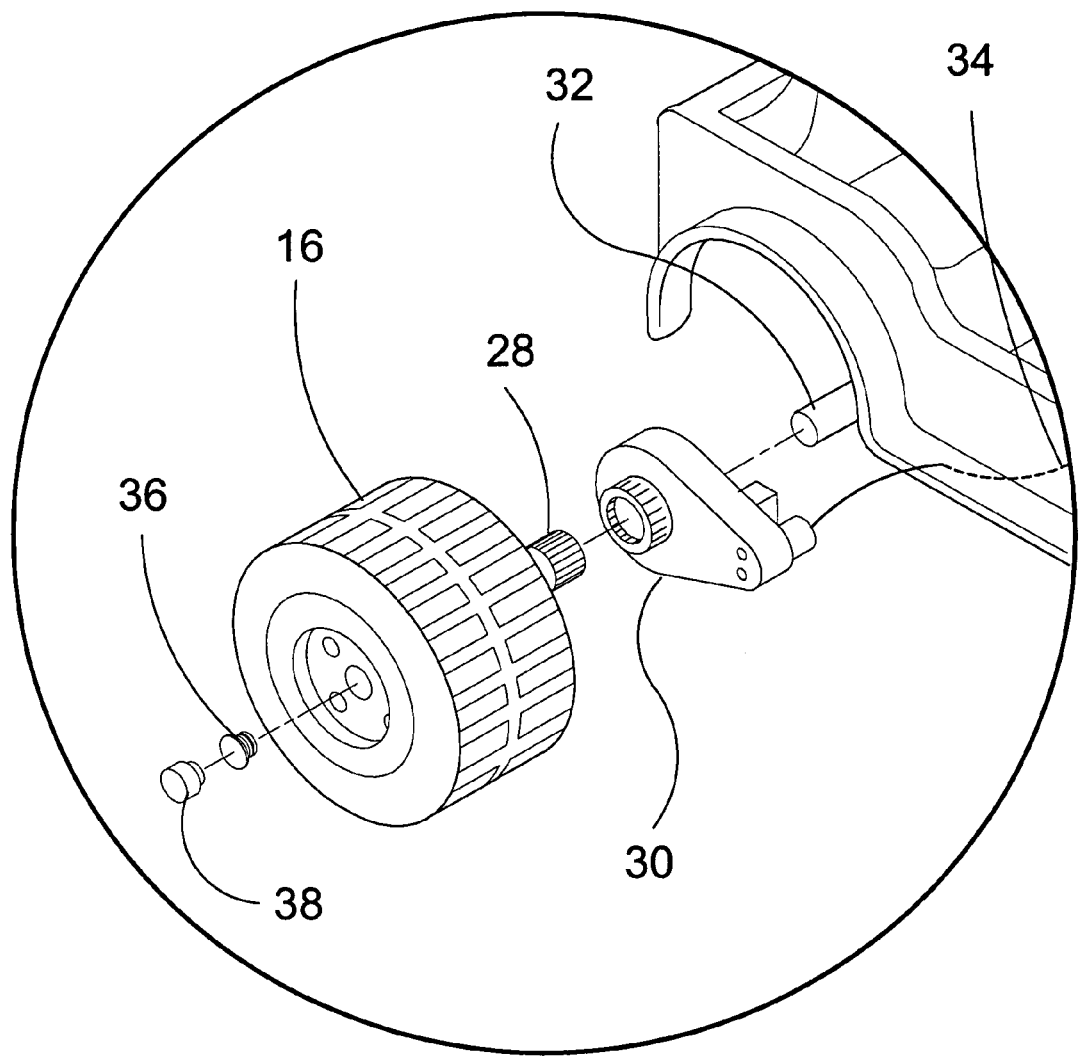
FIG. 4 is a detailed exploded view of the child-rideable motorized vehicle of the present invention.

FIG. 4 is a detailed exploded view of the child-rideable motorized vehicle 10 of the present invention. The child-rideable motorized vehicle 10 is a 4×4 vehicle having tires 16 providing stable movement. Although a 4×4 vehicle is preferred in an optimal embodiment, in practice the vehicle can be of any type with any number of tires. The child-rideable motorized vehicle 10 of the present invention may be used in a manual mode or a remote override mode.

The wheel support includes a driver 28, axle bushing 36 and cap nut 38. The left rear wheel 16 is secured to a driver 28 by an axle bushing 36 topped by a cap nut 38. The axle 32 is also connected to the servo motor 30 on a side opposite the connection with the driver 28. Driver 28 and axle 32 are both driven by servo motor 30 to rotate when activated. A control wire 34 extends from receiver/servo controller 42, shown in FIG. 3, to servo motor 30. An acceleration control signal, originating from the servo controller 42, relates data indicating a desired speed along the control wire 34. Upon receiving the acceleration control signal, the servo motor 30 causes each of the driver 28 and axle 32 to rotate at a predetermined rate which causes the vehicle 10 of the present invention to move.

Figure 5:
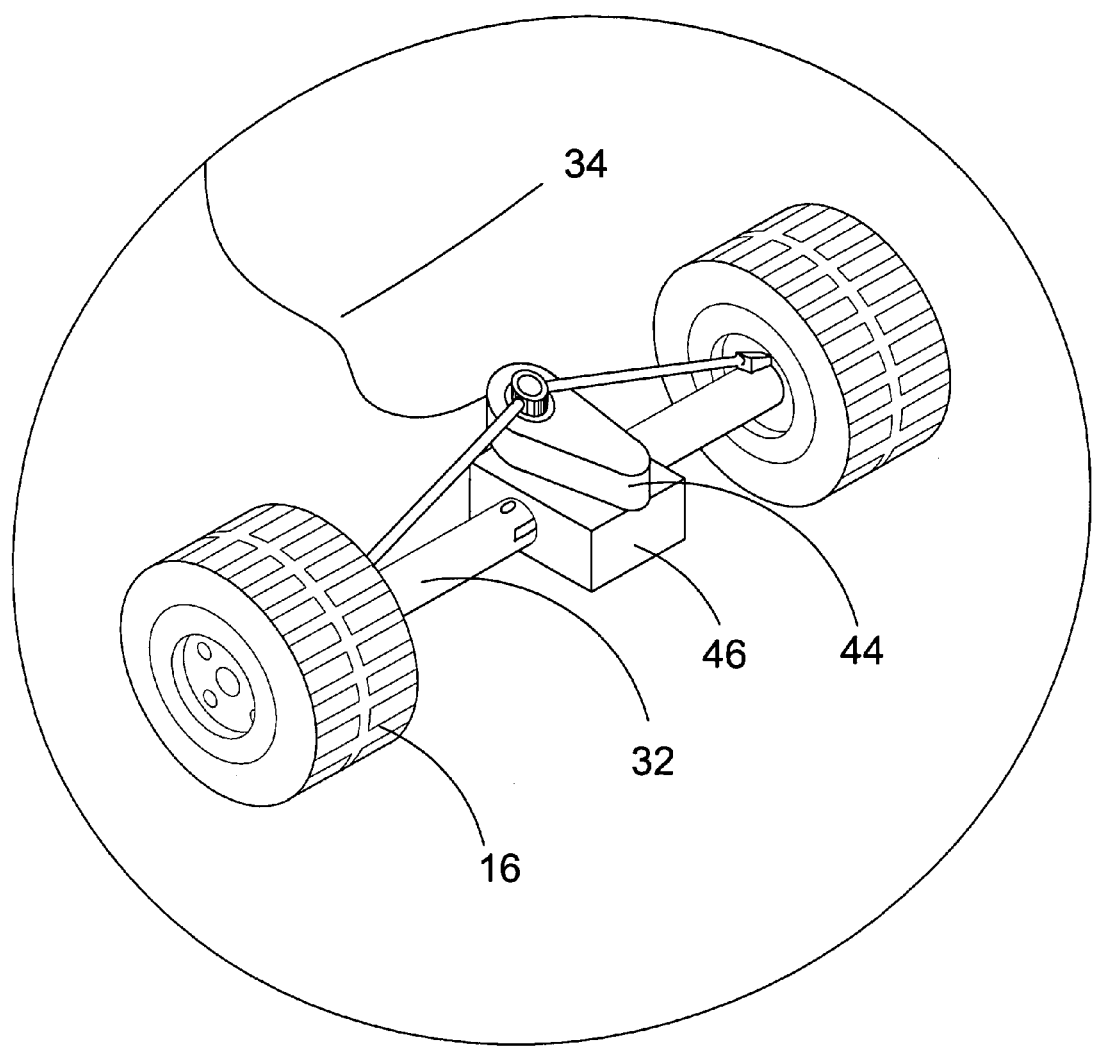
FIG. 5 is a detailed view of the child-rideable motorized vehicle of the present invention.

FIG. 5 is a detailed view of the child-rideable motorized vehicle 10 of the present invention. The child-rideable motorized vehicle 10 is a 4×4 vehicle having tires 16 providing stable movement. Although a 4×4 vehicle is preferred in an optimal embodiment, in practice the vehicle can be of any type with any number of tires. The child-rideable motorized vehicle 10 of the present invention may be used in a manual mode or a remote override mode.

The structure of the front axle includes front axle 32, steering servo motor 44, gearbox 46 and front tires 16. A control wire 34 extends from receiver/servo controller 42, as shown in FIG. 3, to steering servo motor 44. Directional control signals from receiver/servo controller 42, shown in FIG. 3, relate data indicating whether the vehicle will make a left or right turn. Directional control signals travel along control wire 34 to steering servo motor 44. When activated steering servo motor 46 causes the gearbox 46 to guide the direction of front wheels 16 to the left or right thereby turning the vehicle 10 in the corresponding direction.

Figure 6:
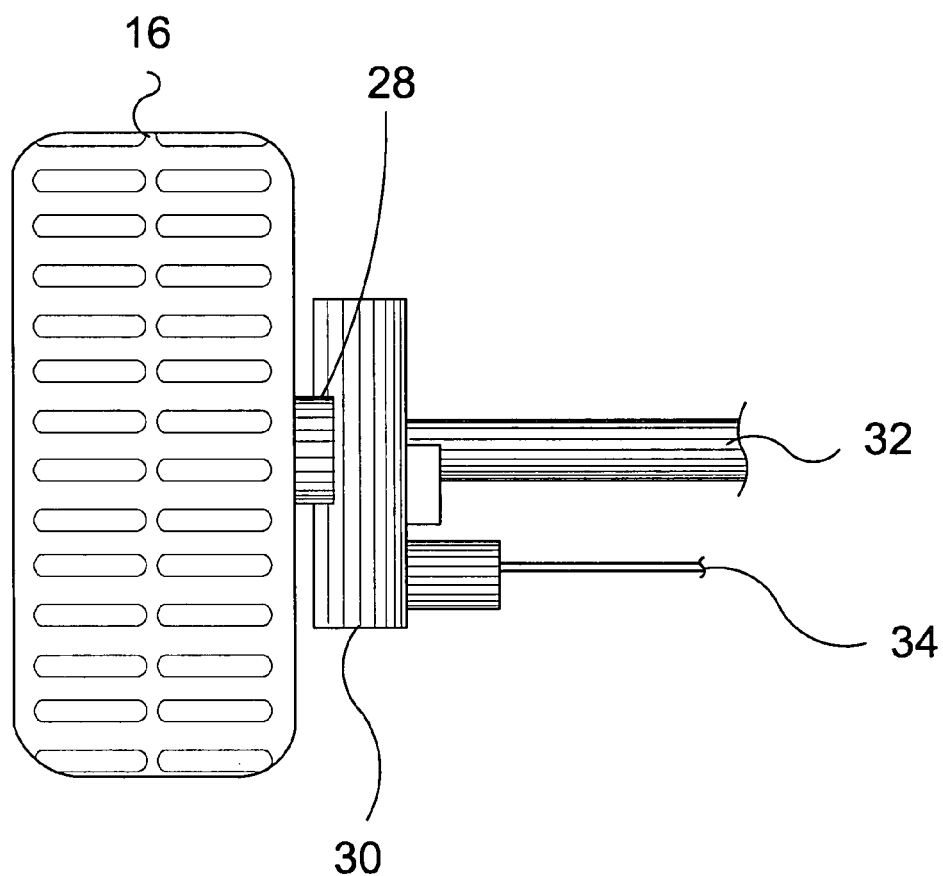
FIG. 6 is a frontal view of the child-rideable motorized vehicle of the present invention.

FIG. 6 is a front view of the child-rideable motorized vehicle 10 of the present invention. The child-rideable motorized vehicle 10 is a 4×4 vehicle having tires 16 providing stable movement. Although a 4×4 vehicle is preferred in an optimal embodiment, in practice the vehicle can be of any type with any number of tires. The child-rideable motorized vehicle 10 of the present invention may be used in a manual mode or a remote override mode.

The wheel support includes a driver 28, axle bushing 36 and cap nut 38. Left rear wheel 16 is secured to a driver 28 by an axle bushing 36 topped by a cap nut 38. The axle 32 is also connected to the servo motor 30 on a side opposite the connection with the driver 28. Driver 28 and axle 32 are both driven by servo motor 30 which rotates them when activated. A control wire 34 extends from receiver/servo controller 42, shown in FIG. 3, to servo motor 30. An acceleration control signal, originating from the servo controller 42, relates data indicating a desired speed. Upon receiving the acceleration control signal, the servo motor 30 causes each of the driver 28 and axle 32 to rotate at a predetermined rate which causes the vehicle 10 of the present invention to move.

Figure 7:
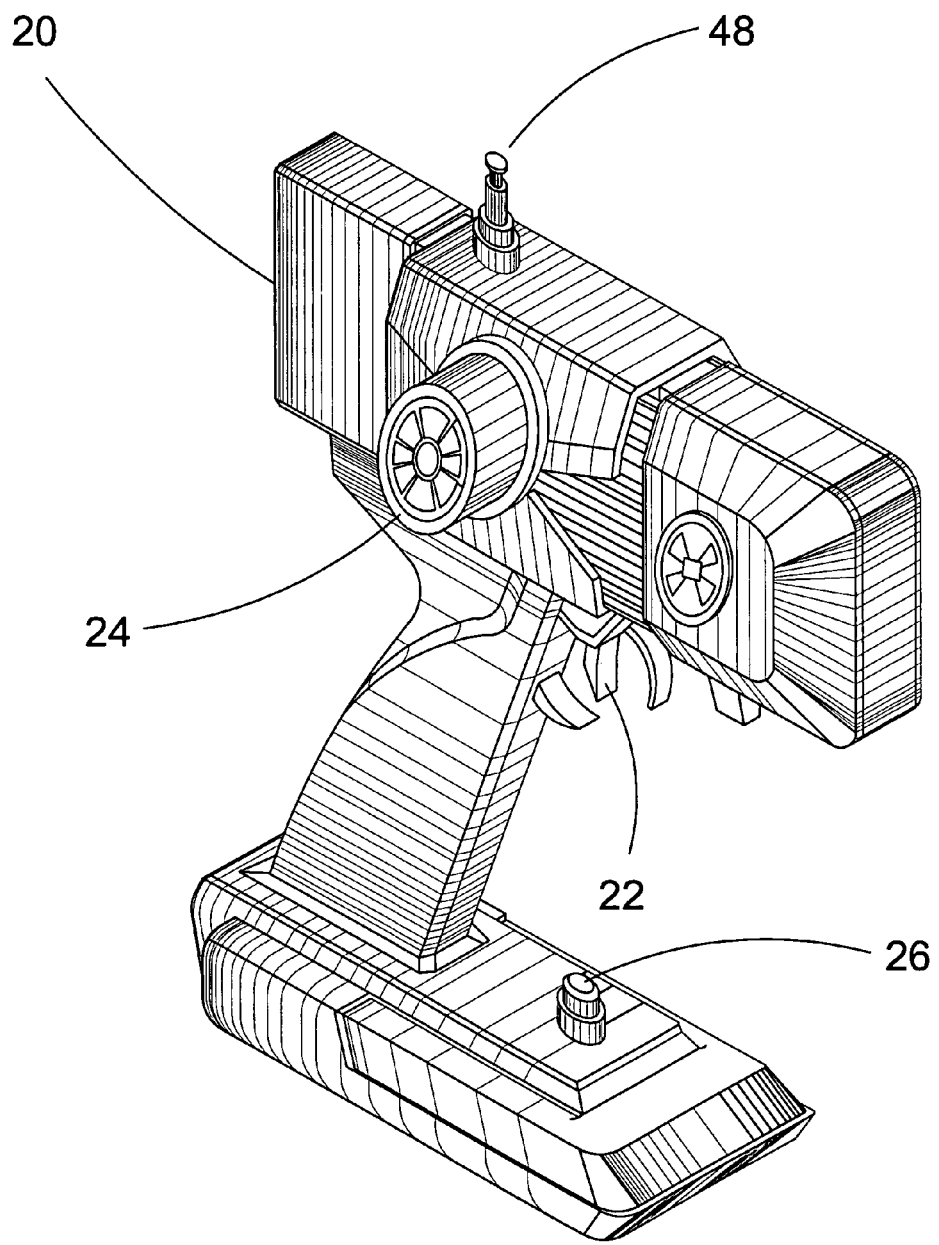
FIG. 7 is a perspective view of the remote control transmitter of the child-rideable motorized vehicle of the present invention.

FIG. 7 is a perspective view of the remote control transmitter of the child-rideable motorized vehicle 10 of the present invention. The child-rideable motorized vehicle 10 is a 4×4 vehicle having tires 16, shown in FIG. 1. Although a 4×4 vehicle is preferred in an optimal embodiment, in practice the vehicle can be of any type with any number of tires. The child-rideable motorized vehicle 10 of the present invention may be used in a manual mode or a remote override mode.

The child-rideable motorized vehicle 10 of the present invention, as shown in FIGS. 1-3, may be used in a manual mode or a remote override mode. The remote control unit 20, as shown herein, is used to control operation of the child-rideable motorized vehicle 10 in the remote override mode. The remote control unit 20 includes Enable/Disable switch 26, acceleration trigger 22, directional controller 24 and transceiver antenna 48. Remote override mode is entered upon activation of Enable/Disable switch 26. Once remote override mode is enabled manual control of the toy vehicle is disabled. The remote override mode provides for control of the vehicle through operation of the directional controller 24 and acceleration trigger 22. Directional controller 24 generates control signals for guiding the vehicle to the left or right while the acceleration trigger 22 generates control signals for controlling the speed of the vehicle. Transceiver antenna 48 allows for increasing the range of the signal transmitted to the receiver/servo unit 42 and thus the range at which the vehicle 10 may travel from the remote control unit 20. Upon toggling Enable/Disable switch 26 a second time to the enable position control of the toy vehicle is re-enabled.

Figure 8:
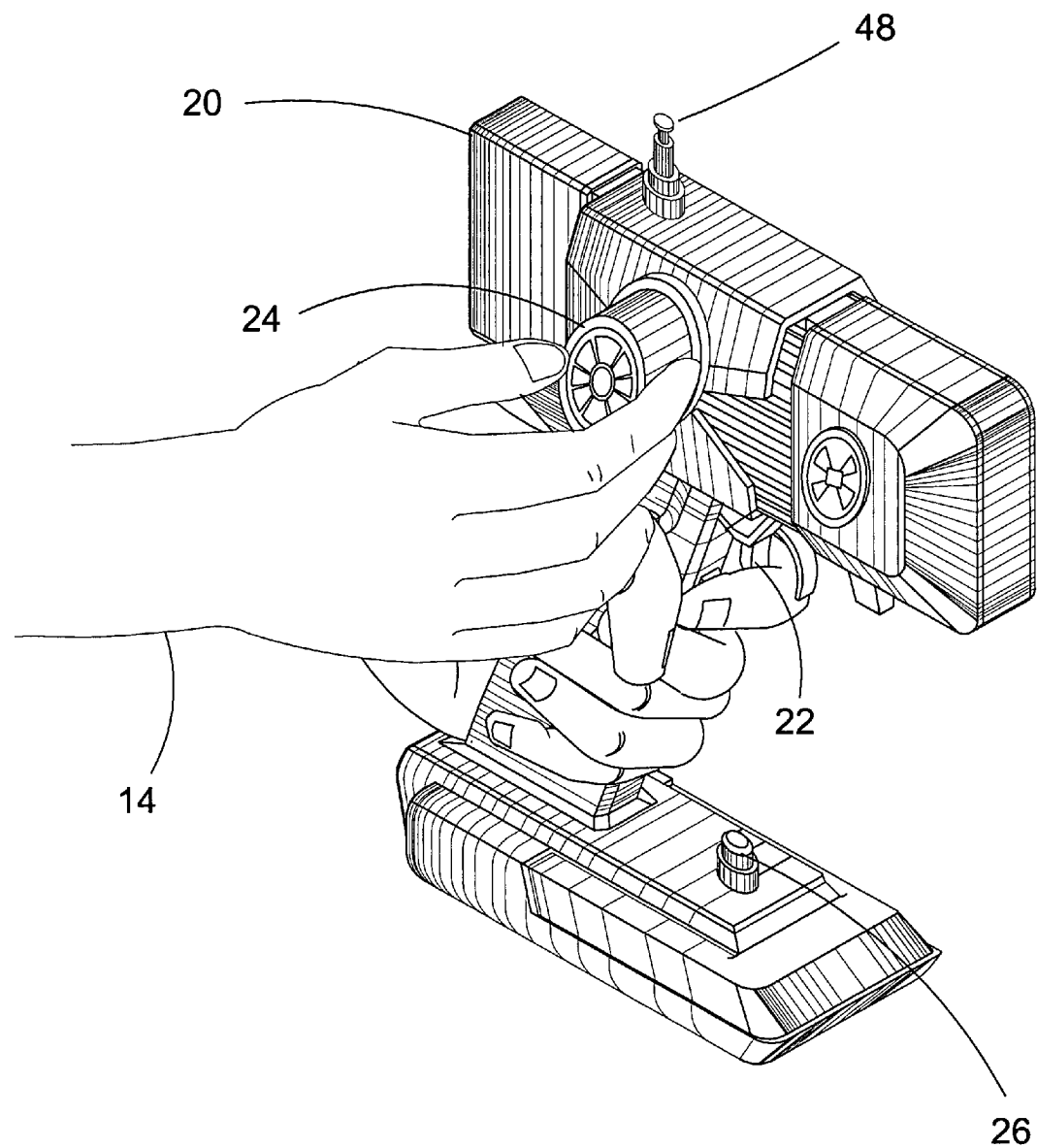
FIG. 8 is an illustrative view of the remote control transmitter of the child-rideable motorized vehicle of the present invention in use.

FIG. 8 is an illustrative view of the remote control transmitter of the child-rideable motorized vehicle 10 of the present invention in use. The child-rideable motorized vehicle 10 is a 4×4 vehicle having tires 16, shown in FIG. 1, providing stable movement. Although a 4×4 vehicle is preferred in an optimal embodiment, in practice the vehicle can be of any type with any number of tires. The child-rideable motorized vehicle 10 of the present invention may be used in a manual mode or a remote override mode.

The child-rideable motorized vehicle 10 of the present invention, as shown in FIG. 3, may be used in a manual mode or a remote override mode. The remote control unit 20, as shown herein, is used to operate the child-rideable motorized vehicle 10 in remote override mode. The remote control unit 20 includes Enable/Disable switch 26, acceleration trigger 22, directional controller 24 and transceiver antenna 48. Remote override mode is entered upon activation of Enable/Disable switch 26. Once remote override mode is enabled manual control of the toy vehicle is disabled. The remote override mode provides for control of the vehicle by directional controller 24 and acceleration trigger 22. Acceleration of the vehicle is controlled by the intensity of the user/parent 14's squeezing of the acceleration trigger 22. The vehicle is guided left and right by the user/parent 14's turn of directional controller 24. Transceiver antenna 48 increases the range of the signal transmitted to the receiver/servo unit 42 shown in FIG. 3. Upon toggling Enable/Disable switch 26 a second time to the enable positions control of the toy vehicle is re-enabled.

Figure 9:
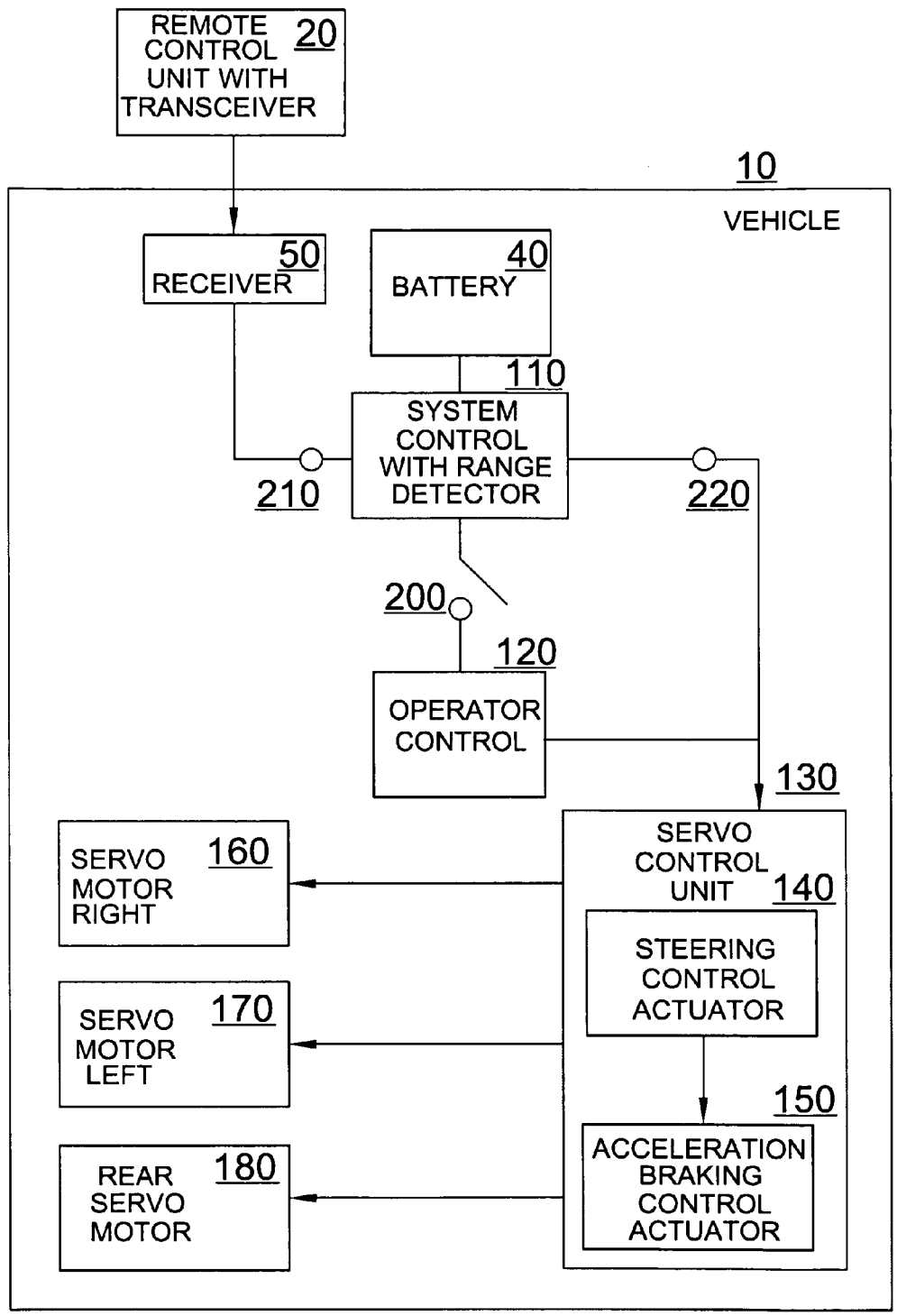
FIG. 9 is a block diagram of the remote control unit of the child-rideable motorized vehicle of the present invention in remote override mode.

FIG. 9 is a block diagram of the remote control unit of the child-rideable motorized vehicle 10 of the present invention in remote override mode. Remote control transmitter 20 communicates with child-rideable motorized vehicle 10 to toggle between a manual mode and a remote override mode. Switches 200, 210 and 220 connect to system controller and range detector 110. When receiver 50 receives a signal indicating a toggle into remote override mode, switches 210 and 220 are caused to move from a first open position to a second closed position creating a transmission path for messages through system controller with range detector 110. In remote override mode manual controls are disabled, therefore switch 200 is caused to move from a second closed position to a first open position in remote override mode.

The system controller with range detector unit 110 is powered by battery 40. System controller 110 transmits control signals from the receiver 50 to servo control unit 130. Range detector 110 detects the distance from the remote control transmitter 20 to the remote enabled motorized toy 10. When the remote enabled motorized toy 10 exceeds a predetermined distance a signal is sent to servo control unit 130 to stop the vehicle.

Servo control unit 130 receives steering control signals and acceleration control signals from either system controller with range detector 110 or operator control 120. Accordingly servo control unit 130 includes a steering control actuator 140 and an acceleration control actuator 150. Steering control signals, indicating a desired turn of the front tires to the left or right, are processed by steering control actuator 140. Steering control actuator 140 then sends either a servo motor right signal 160 or a servo motor left signal 170 to steering servo motor 44 shown in FIG. 5. Acceleration control signals, indicating the desired speed of the vehicle 10, are processed by acceleration control actuator 150. Acceleration control actuator 150 then sends a rear servo motor signal 180, indicating a control speed, to rear servo motor 30, shown in FIG. 4.

Figure 10:
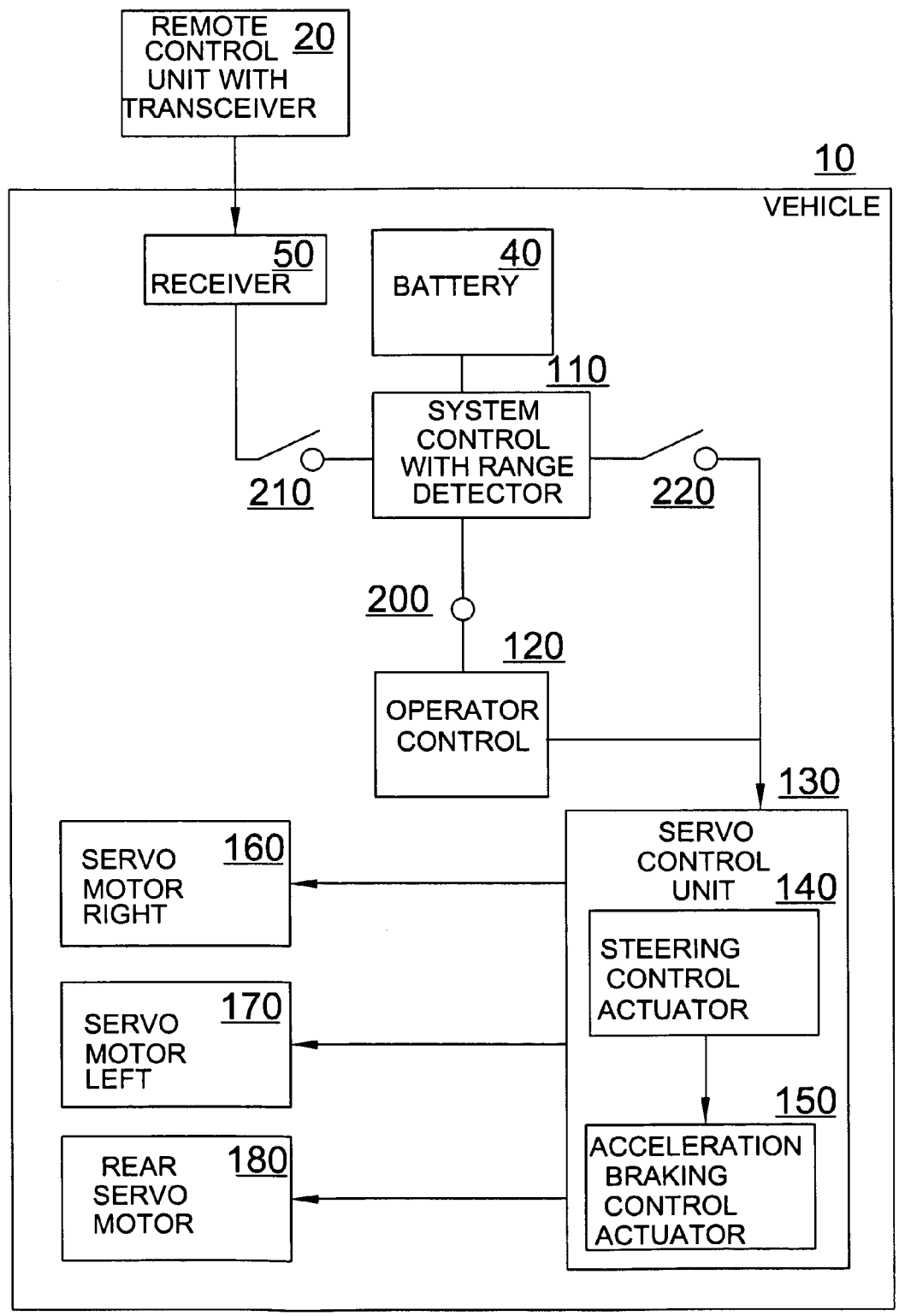
FIG. 10 is a block diagram of the remote control unit of the child-rideable motorized vehicle of the present invention in manual mode.

FIG. 10 is a block diagram of the remote control unit of the child-rideable motorized vehicle 10 of the present invention in manual mode. Remote control transmitter 20 communicates with child-rideable motorized vehicle 10 to toggle between a manual mode and a remote override mode. Switches 200, 210 and 220 connect to system controller and range detector 110. In manual mode remote controls are disabled, therefore switches 210 and 220 are caused to move from a second closed position to a first open position disestablishing a transmission path to the servo controller unit 130 through system controller 110. Switch 200 is caused to move from a first open position to a second closed position to provide power from battery 40 through system controller 110.

Operator control 120 transmits controls signals from manual controls 18 shown in FIG. 1 to servo control unit 130. Range detector 110 detects the distance from the remote control transmitter 20 to the remote enabled motorized toy 10. When the remote enabled motorized toy 10 exceeds a predetermined distance a signal is sent to servo control unit 130 to stop the vehicle.

Servo control unit 130 receives steering control signals and acceleration control signals from either system controller with range detector 110 or operator control 120. Accordingly servo control unit 130 includes a steering control actuator 140 and an acceleration control actuator 150. Steering control signals, indicating a desired turn of the front tires to the left or right, are processed by steering control actuator 140. Steering control actuator 140 then sends either a servo motor right signal 160 or a servo motor left signal 170 to steering servo motor 44 shown in FIG. 5. Acceleration control signals, indicating the desired speed of the vehicle 10, are processed by acceleration control actuator 150. Acceleration control actuator 150 then sends a rear servo motor signal 180, indicating a control speed, to rear servo motor 30, shown in FIG. 4.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A controllable vehicle system comprising;
    a vehicle including:
        a compartment for receiving a rider;
        at least one wheel;
        manual controls for controlling operation of said at least one wheel upon receipt of a control signal from the rider;
        a control override switch for disabling said manual controls; and,
        a receiver, and
    a remote control device including:
        means for generating control signals upon command signals received from a user;
        a switch for toggling between a manual operation mode of said vehicle and a remote override mode for remote operation of said vehicle;
        a transmitter for transmitting said control signals to said receiver of said vehicle for activating said control override switch for controlling operation of said at least one wheel when said switch is toggled into the remote override mode;
        a range detector unit in said vehicle; and
        means in response to said receiver receiving a signal indicating a toggle into remote override mode for creating a transmission path for messages through said range detector unit to a servo control unit, said range detector sending a signal to said servo control unit to stop said vehicle when said vehicle exceeds a predetermined distance from said transmitter in said remote control device, whereby said range detector unit is operable only when said controllable vehicle system is in the remote override mode; and
    a rear servo motor for rotating said at least one wheel and a steering servo motor for steering said vehicle, both said rear and steering servo motors being controlled by said servo control unit.

2. The controllable vehicle system according to claim 1, wherein said remote control device includes a base, an elongated member having one end mounted on said base and a control module mounted on said elongated member.

3. The controllable vehicle system according to claim 2, wherein said control override switch includes an enable/disable push button switch mounted on said base for alternately moving between control of said vehicle by the rider in said vehicle in said manual operation mode of said vehicle and the user of said remote control device in said remote override mode.

4. The controllable vehicle system according to claim 3, further comprising an acceleration trigger extending from said control module for controlling speed of said vehicle by the user of said remote control device in said remote override mode.

5. The controllable vehicle system according to claim 4, further comprising a directional controller mounted on said control module for steering said vehicle.

6. A controllable vehicle system comprising;
a) a toy vehicle having a compartment for receiving a driver;
b) said vehicle having rear wheels and front wheels;
c) at least one driving servo motor mounted on an axle adjacent one of said rear wheels for driving said rear wheels;
d) a steering servo motor mounted between said front wheels for steering said vehicle;
e) manual controls for said driver to steer and drive said vehicle using electrical power for energizing said servo motors, an operator control unit responding to said manual controls for sending driving and steering signals to said servo motors;
f) said vehicle having a receiver and a system control;
g) a hand held remote control unit having a transceiver and an antenna,
h) said remote control unit having a switch for toggling between manual operation of said vehicle and remote override mode for remote operation of said vehicle;
i) said receiver in said vehicle upon receiving a remote override signal from said remote control unit enables said system control by closing switches connected to said system control and opening an operator control switch, said system control delivering signals to said servo motors bypassing said operator control unit for controlling operation of said vehicle;
j) said receiver in said vehicle up on receiving a manual operation signal from said remote control unit opening said switches connected to said system control and closing said operator control switch thereby isolating said system control and restoring driver control of said vehicle through said operator control unit; and
k) a range detector in said system control disabling said vehicle when said vehicle moves beyond a predetermined distance from said remote control unit while said vehicle is in remote override mode.

7. The controllable vehicle system of claim 6 in which said transceiver antenna on said remote control unit allows for increasing the range of the signal transmitted to said receiver and thus the distance the vehicle may travel from the remote control unit.

* * * * *